United States Patent [19]
Gustafson

[11] Patent Number: 6,152,511
[45] Date of Patent: Nov. 28, 2000

[54] CONVERTIBLE TRAILER SYSTEM

[76] Inventor: Leonard L. Gustafson, 13969 S. 15 Rd., Rapid River, Mich. 49878

[21] Appl. No.: 09/255,471

[22] Filed: Feb. 22, 1999

[51] Int. Cl.[7] .................................................. B62D 33/03
[52] U.S. Cl. ........................... 296/32; 296/14; 296/26.06; 296/181
[58] Field of Search .................................. 296/32, 3, 14, 296/26.06, 182, 36, 26.04, 33, 34, 13, 180, 181; 105/378, 379

[56] References Cited

U.S. PATENT DOCUMENTS

| | | |
|---|---|---|
| 720,923 | 2/1903 | Ingoldsby . |
| 784,156 | 3/1905 | Haeske . |
| 912,430 | 2/1909 | Smither . |
| 1,023,617 | 4/1912 | Botteese . |
| 1,238,180 | 8/1917 | Netherland . |
| 2,133,902 | 10/1938 | Patrick ...................................... 296/13 |
| 2,651,268 | 9/1953 | Casciano ................................. 105/379 |
| 2,993,727 | 7/1961 | Zewiske .................................... 296/32 |
| 3,572,812 | 3/1971 | Norcia ...................................... 296/32 |
| 4,095,838 | 6/1978 | Beeler ....................................... 295/32 |
| 4,826,237 | 5/1989 | Socha ........................................ 296/32 |
| 5,056,859 | 10/1991 | Walder ..................................... 296/180 |
| 5,429,403 | 7/1995 | Brasher .................................... 296/32 |

*Primary Examiner*—D. Glenn Dayoan
*Assistant Examiner*—Patricia Engle
*Attorney, Agent, or Firm*—Andrus, Sceales, Starke & Sawall, LLP

[57] ABSTRACT

A convertible trailer system for use in hauling stacked logs. The convertible trailer includes a pair of movable retaining panels mounted on each side of the trailer. Each of the retaining panels is movable between a transporting position and a loading position. When the retaining panels are in the transporting position, the retaining panels prevent stacked logs from falling off the side of the trailer. The convertible trailer includes a drive assembly operably connected to each of the retaining panels for raising and lowering the retaining panels between the transporting position and the locked position. A locking assembly is associated with each of the retaining panels to lock the retaining panel in the transporting position when the trailer is being used to transport a load of stacked logs.

20 Claims, 3 Drawing Sheets

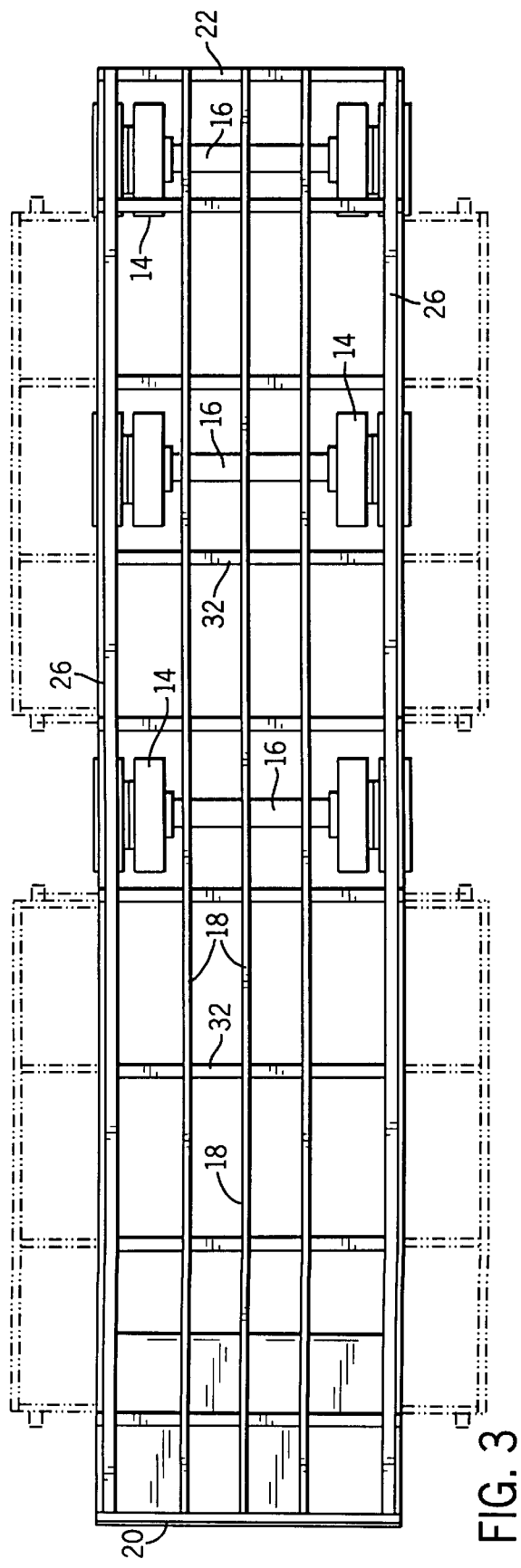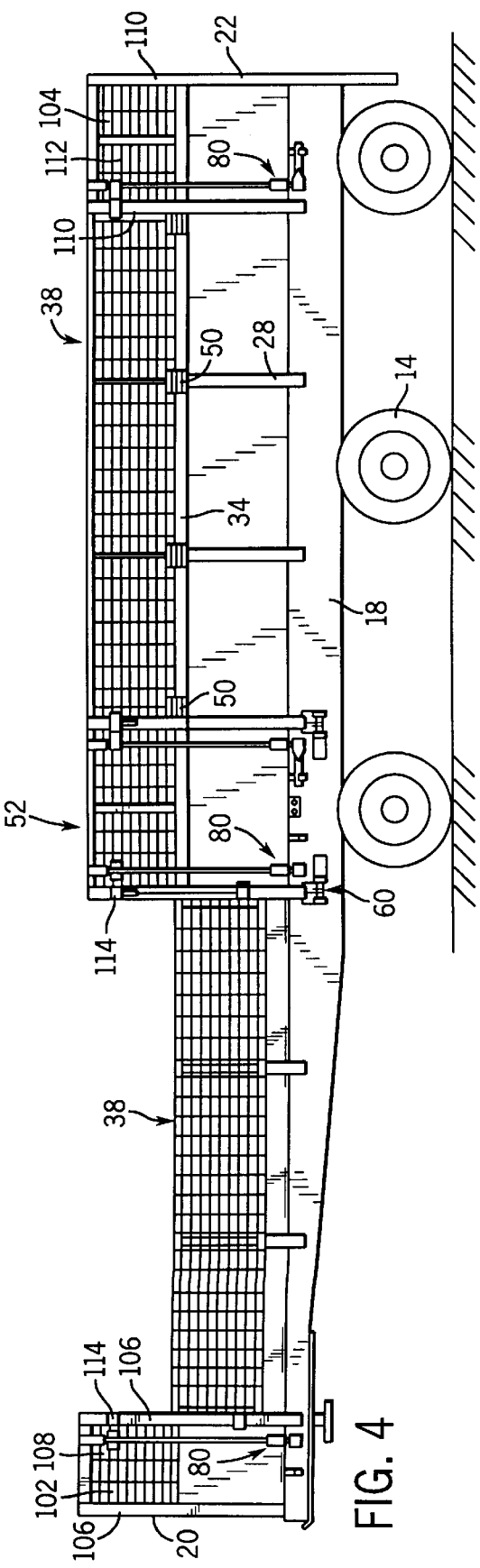

CONVERTIBLE TRAILER SYSTEM

BACKGROUND OF THE INVENTION

The present invention relates to an enclosure for transporting large bulk materials not easily contained. More specifically, the present invention relates to a convertible trailer system for transporting a plurality of stacked logs that includes hinged retaining panels positioned on each side of the trailer to enclose the trailer during transportation of the stacked logs.

In the logging industry, trees that have been harvested are cut into numerous individual logs that each typically have a length of typically, but not limited to, 8 feet. The individual logs are then stacked on a conventional logging trailer and hauled to the desired location over public highways by a semi tractor.

Conventional logging trailers typically include a generally open back and open sides. Each of the sides includes a plurality of spaced support tines that generally retain the individual stacked logs within the body of the trailer. The back end of conventional logging trailers also includes a plurality of spaced support tines that prevent the stacked logs from rolling rearwardly off of the back end of the trailer. This type of trailer allows the logs to be easily loaded and unloaded since the sides of the trailer are generally open to permit machinery to easily enter into the trailer and grasp bundles of logs.

When the conventional logging trailer identified above has been used for numerous years in transporting logs, this type of trailer includes a significant unsafe design feature; namely that logs may slide off of the side of the trailer during transportation. Specifically, the trailer is designed such that the support tines spaced along the sides of the trailer are spaced at a distance great enough to permit logs to slide longitudinally between the tines and off of the trailer. Since trailers stacked with a plurality of logs travel along public highways, a single log falling from such a trailer greatly endangers others who are also traveling on the public highway.

One remedy to the problem identified above is to utilize a logging trailer having solid sidewalls, such that the logging trailer completely encloses the stacked logs. However, loading and unloading a logging trailer having solid sidewalls is difficult since logs that are not perfectly aligned may contact the trailer sidewalls and become askew within the trailer. If individual logs become askew, orderly and efficient stacking of the logs within the trailer becomes impossible, such that the person loading the trailer must stop and reorganize the stack within the logging trailer.

Therefore, it is an object of the present invention to provide an enclosure for a plurality of stacked logs that includes movable retaining panels that completely enclose the stacked logs during transportation and are movable to a loading position to facilitate loading or unloading of the logs. It is a further object of the invention to provide a trailer that has wire mesh retaining panels that are movable between a loading position and a transporting position. It is a further object of the invention to provide a drive assembly that is associated with each of the movable retaining panels to move the retaining panels between the loading position and the transporting position. It is a further object of the invention to provide a locking assembly associated with each of the retaining panels to hold the retaining panels securely in the transporting position to prevent logs from falling from the trailer.

SUMMARY OF THE INVENTION

The present invention is an enclosure, particularly a trailer, used to transport large bulk materials not easily contained, such as a plurality of stacked logs. The trailer includes a pair of solid structural lower sidewalls that extend along the sides of the trailer. Each of the sidewalls is defined by a top edge surface. A fixed panel defined by a pair of spaced uprights extends from the top edge of each sidewall. The fixed panel preferably includes wire mesh supported between the pair of spaced uprights.

The fixed panel is positioned adjacent to at least one movable retaining panel that is hingedly connected to the top edge surface of the sidewall. In the preferred embodiment of the invention, the fixed panel is positioned between a pair of hinged retaining panels along each sidewall of the trailer. The retaining panels each are movable between a transporting position in which the retaining panel extends upwardly from the top edge surface of the lower sidewall and a loading position in which the retaining panel is folded down and positioned generally next to the lower sidewall.

Each of the retaining panels generally is defined by parallel top and bottom rails and a plurality of spaced supports extending therebetween. Each of the retaining panels includes wire mesh positioned between the top and bottom rails such that each of the retaining panels prevents logs stacked in the trailer from sliding laterally from the trailer when the retaining panel is in the transporting position.

A drive assembly associated with each of the retaining panels is mounted to the trailer to move the respective retaining panel between the transporting position and the loading position. Specifically, the drive assembly includes a drive motor operatively coupled to a spool including a wound supply of cable. The cable, in turn, is attached at one end to the retaining panel near the top rail of the retaining panel. Specifically, the cable extends through one of the uprights defining the fixed panel and is securely attached to a locking tab extending from the retaining panel. The drive motor is operable to wind or unwind the cable from the spool and thus move the retaining panel between the loading position and the transporting position.

At least one locking assembly is associated with each of the retaining panels to secure the respective retaining panel in the transporting position. In the preferred embodiment of the invention, each retaining panel is received by a pair of locking assemblies positioned in opposed ends of the retaining panel. Each of the locking assemblies includes a latch member that receives one of the locking tab formed on the retaining panel. The latch member of the locking assembly receives the locking tab and retains the locking tab to prevent the retaining panel from leaving the transporting position when the trailer is being transported. Preferably, the locking assembly includes a locking handle that is mechanically retained in a locked position to prevent the retaining panel from moving from the transporting position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a top plan view of the convertible trailer of the present invention;

FIG. 4 is a side plan view of the convertible trailer of the present invention with one retaining panel in the transporting position and a second retaining panel in the loading position;

DETAILED DESCRIPTION OF THE INVENTION

Figure 1:
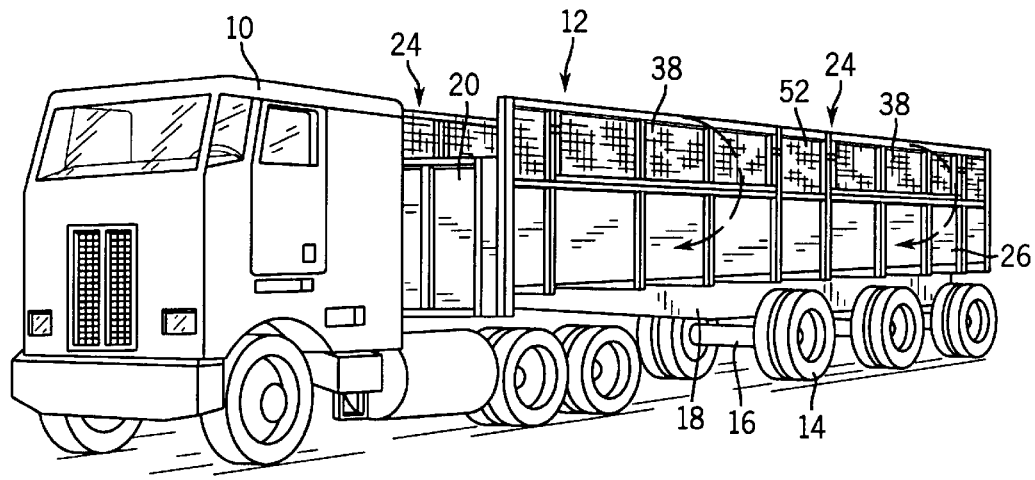
FIG. 1 is a perspective view of a semi tractor pulling a convertible trailer of the present invention.

FIG. 1 illustrates a semi tractor 10 pulling a convertible logging trailer 12 constructed in accordance with the present invention. The trailer 12 shown in FIG. 1 is particularly useful in carrying a load of large bulk materials not easily contained, such as a plurality of stacked logs oriented to extend transversely relative to longitudinal length of the trailer 12. The trailer 12 is coupled to the tractor 10 in a conventional manner such that the tractor 10 can pull the trailer 12 along public highways as is commonly known.

The trailer 12 includes a plurality of wheels 14 each supported by an axle 16 that is fixed to longitudinal load bearing rails 18 that extend the entire longitudinal length of the trailer 12 and are spaced as shown in FIG. 3.

The trailer 12 generally includes an upright fixed front wall 20, a fixed back wall 22 and a pair of sides 24 such that the trailer 12 defines a generally rectangular interior. In the preferred embodiment of the invention, the vehicle sides 24 are laterally spaced by slightly more than 8 feet such that individual logs can be positioned transverse to the longitudinal length of the trailer 12 between the vehicle sides 24.

Each of the sides 24 of the trailer 12 includes a stationary sidewall 26 that extends along the entire longitudinal length of trailer 12 between the front wall 20 and the back wall 22. The sidewall 26 is preferably formed from sheet steel having a thickness of approximately 3/16 of an inch. The sidewall 26 includes a plurality of spaced upright supports 28 positioned along the longitudinal length of the trailer 12. Each of the upright supports 28 is attached at its lower end to a rail 32 that extends transversely across the underside of the trailer 12 and is joined to the load bearing rails 18. Each of the rails 32, along with the load bearing rails 18, defines a portion of the bottom support surface for the trailer 12, as can be seen in FIG. 3. The bottom support surface of the trailer 12 is a grid-like structure that supports the plurality of stacked logs.

Each of the sidewalls 26 includes an upper rail 34 that defines a top edge surface 36 for the sidewall 26. The upper rail 34 extends along the entire longitudinal length of the sidewall 26 between the front wall 20 and the back wall 22, as best shown in FIG. 4.

Figure 2:
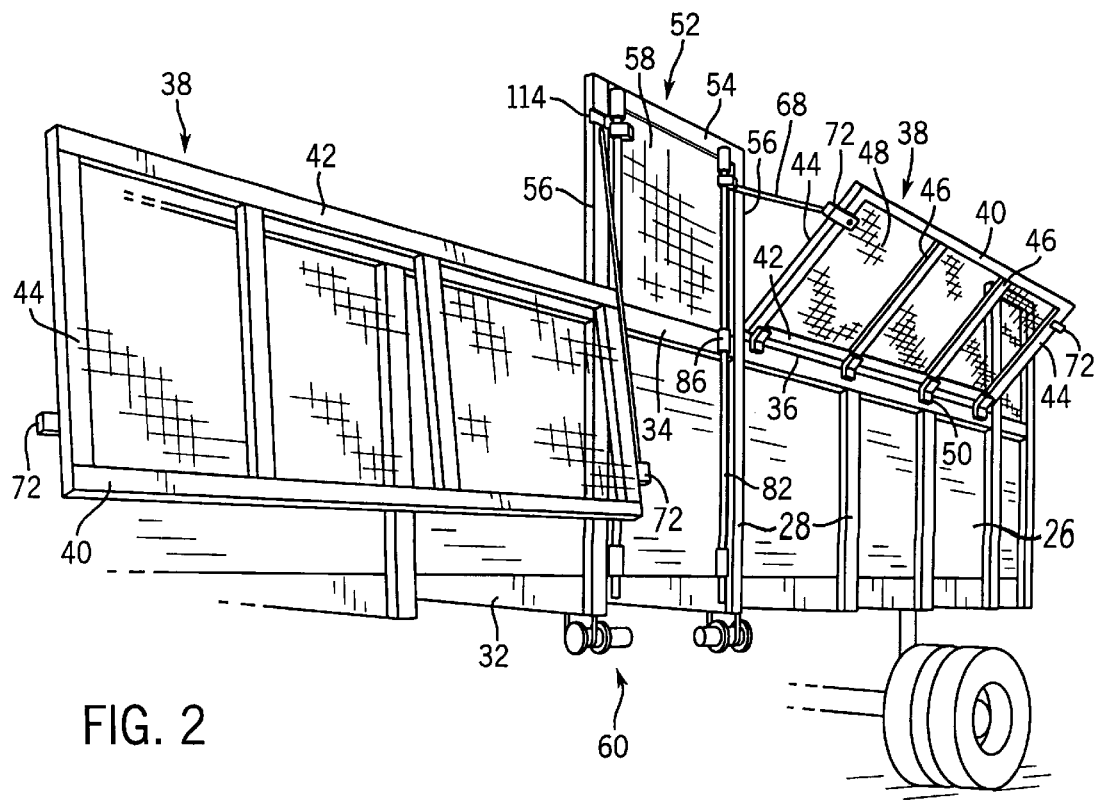
FIG. 2 is an enlarged perspective view of the convertible trailer of the present invention illustrating the movement of a pair of retaining panels from a transporting position to a loading position.

Referring now to FIGS. 2 and 4, at least one retaining panel 38 is hingedly mounted to the top edge surface 36 of each sidewall 26. In the embodiment of the invention shown in the figures, a pair of retaining panels 38 are shown mounted to each sidewall 26 of the trailer 12. It should be understood that the number of retaining panels 38 positioned on each of the sidewalls 26 depends upon the longitudinal length of the trailer 12. For example, if the trailer 12 was significantly shortened from the embodiment shown in the figures, a single retaining panel 38 could be used while operating within the scope of the present invention.

Each of the retaining panels 38 generally includes a top rail 40, a parallel bottom rail 42 and opposed side rails 44 positioned to extend between the top rail 40 and the bottom rail 42. The combination of the top rail 40, the bottom rail 42, and the pair of side rails 44 defines an outer frame for the retaining panel 38. AS shown in FIG. 2, a pair of spaced supports 46 extend between the top rail 40 and bottom rail 42 and are spaced between the pair of side rails 44 to provide additional support for the retaining panel 38. In the embodiment of the invention shown, a wire mesh screen 48 is positioned to extend across the entire frame of the retaining panel 38 such that the retaining panel 38 is generally transparent while having the required structural integrity to prevent logs stacked within the trailer 12 from passing between the spaced supports 46 and side rails 44.

Referring again to FIGS. 2 and 4, each of the retaining panels 38 is hingedly mounted to the respective sidewall 26 by a plurality of hinges 50 spaced along the longitudinal length of the retaining panel 38. Specifically, each of the hinges 50 is mounted to both the bottom rail 42 of the retaining panel 38 and the upper rail 34 of the sidewall 26. The plurality of hinges 50 allow each of the retaining panels 38 to be movable between a transporting position, in which the retaining panel 38 is generally vertical and extends upwardly from the sidewall 26, and a loading position in which the retaining panel 38 is folded down and positioned generally adjacent to the sidewall 26.

As can be understood in FIGS. 2 and 4, each of the retaining panels 36 is independently movable such that the pair of retaining panels 38 shown can be raised and lowered separately if desired. When the retaining panels 38 are in the upright, transporting position, the retaining panels 38 completely encloses the trailer 12 to prevent stacked logs from shifting and moving transversely relative to the longitudinal length of the trailer 12. When the retaining panels 38 are moved to their folded, loading position, the stacked logs positioned above the top edge surface 36 of the sidewall 26 are freely accessible for both loading and unloading of the trailer 12. Thus, the trailer 12 of the present invention has the advantage of completely enclosing stacked logs during transportation while being convertible to permit easy loading and unloading when the retaining panels 38 are in their loading position.

Referring again to FIG. 2, a fixed panel 52 extends upwardly from the top edge surface 36 of each sidewall 26 and is positioned between the pair of retaining panels 38. The fixed panel 52 generally includes a top rail 54 extending between a pair of parallel, spaced uprights 56. Each of the uprights 56 is an extension of one of the upright supports 28 positioned along the sidewall 26 that extends upwardly past the top edge surface 36 of the upper rail 34. Like each of the retaining panels 38, the fixed panel 52 includes a wire mesh screen 58 mounted to the frame defined by the top rail 54, the pair of uprights 56 and a portion of the upper rail 34. The wire mesh screen 58 prevents stacked logs from passing between the pair of spaced uprights 56 when the trailer 12 is transporting a plurality of stacked logs. When both of the retaining panels 36 are in their upright, transporting position, the combination of the fixed panel 52 and the retaining panels 38 form a completely enclosed interior, as shown in FIG. 1.

Figure 5:
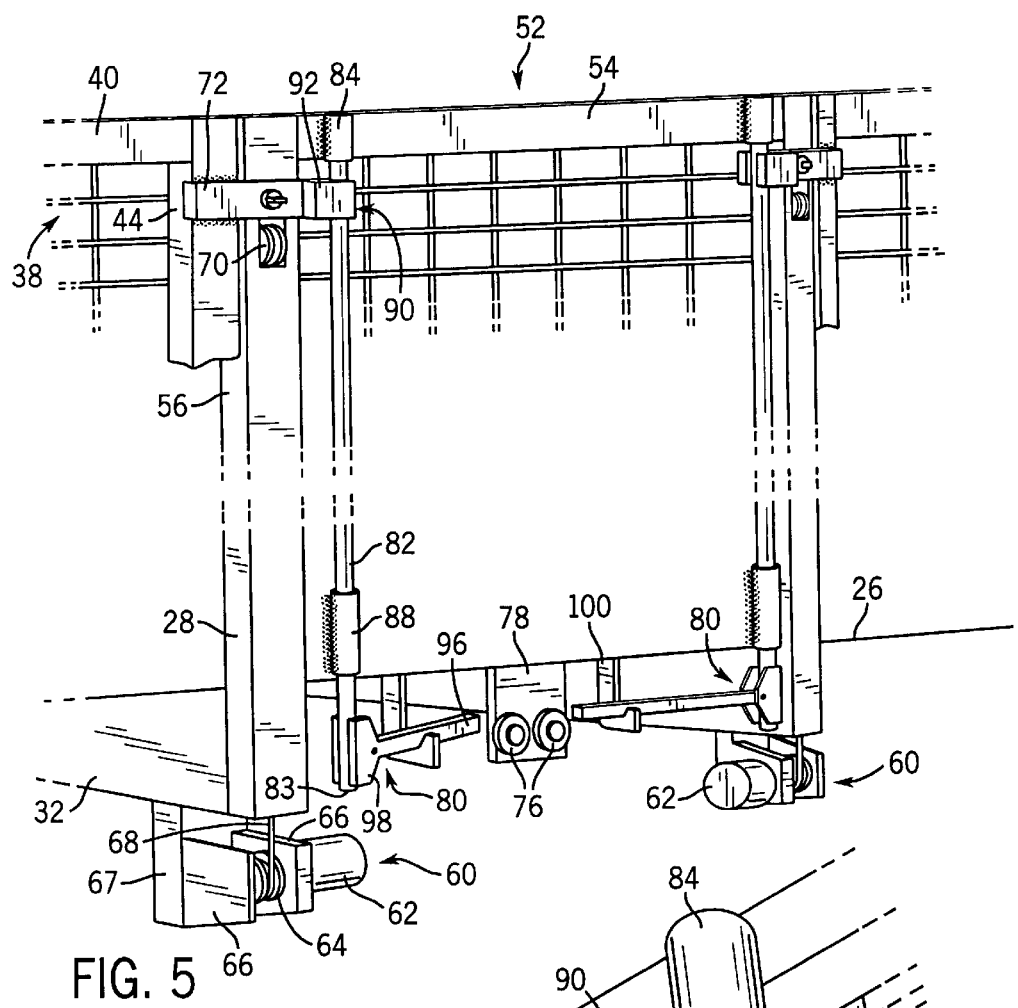
FIG. 5 is a partial perspective view illustrating the drive assembly and locking assembly of the convertible trailer.

Referring now to FIGS. 2 and 5, an individual, separate drive assembly 60 is associated with each of the retaining panels 38. Each drive assembly 60 is operable to move the respective retaining panel 38 between the loading position and the transporting position. In the preferred embodiment of the invention, the drive assembly 60 includes an electric drive motor 62 operatively coupled to a rotatable spool 64. The spool 64 and drive motor 62 are mounted to one of the rails 32 positioned below the sidewall 26. Specifically, the spool 64 is mounted between a pair of support flanges 66 fixed to a mounting beam 67 extending downwardly from the rail 32. The spool 64 is generally aligned with the hollow interior defined by the upright support 28 that extends above the top edge surface 36 of the sidewall 26 to define the upright 56 of the fixed panel 52.

The spool 64 includes a cable 68 wound thereupon. Cable 68 extends upwardly from the spool 64 through the generally hollow interior of the upright support 28 and upright 56 and passes around a pulley 70 rotatably supported within the upright 56. From the pulley 70, the end of the cable 68 is securely attached to a locking tab 72 fixed to and extending from one of the side rails 44 defining the retaining panel 38. The locking tab 72 is preferably welded to the side rail 44 near the top of the retaining panel 38 defined by the top rail 40.

Figure 6:
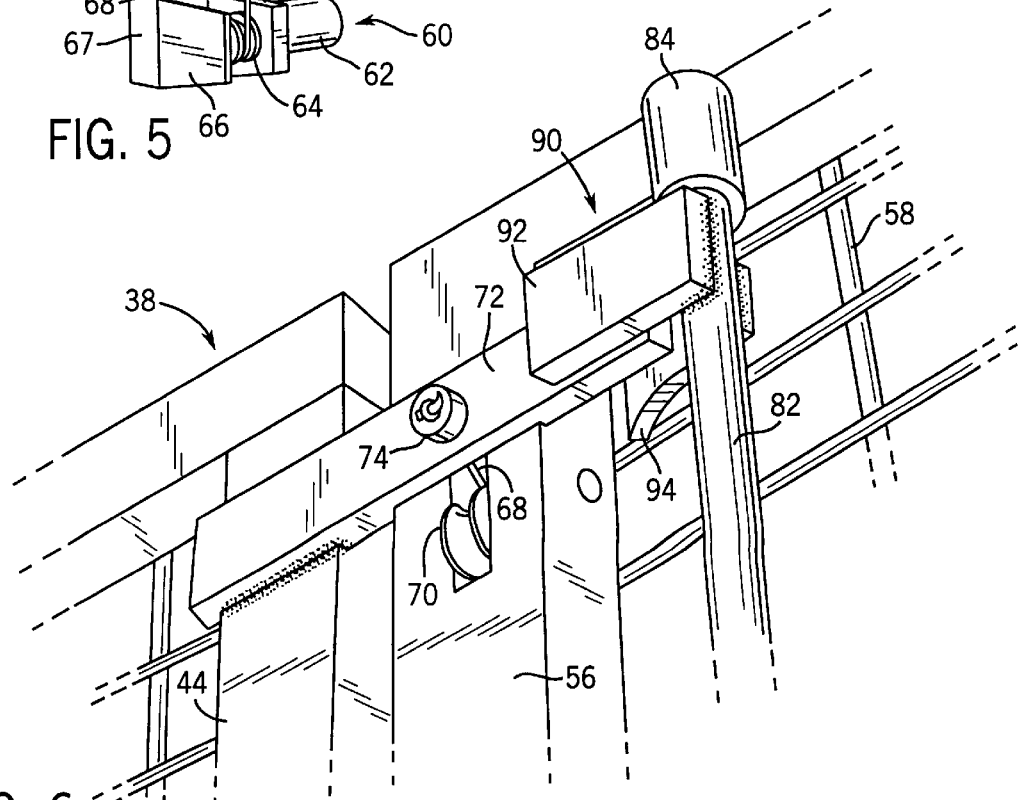
FIG. 6 is an enlarged partial perspective view illustrating the interaction between the locking tab contained on the retaining panel and a latch formed on the locking assembly.

As can best be seen in FIG. 6, the end of the cable 68 extends through a hole formed in the locking tab 72 and is retained by a stop member 74. In this manner, one end of the cable 68 is securely attached to the locking tab 72 while the other end is wound around the spool 64 such that rotation of the spool 64 shortens or lengthens the cable 68, depending upon the direction of spool rotation.

As shown in FIG. 5, a pair of operating switches 76 are mounted to a support plate 78 that extends from the bottom edge of the sidewall 26. Each of the operating switches 76 is electrically coupled to the drive motor 62 of one of the two drive assemblies 60 shown, such that each of the drive motors 62 can be operated independently from each other. Although not shown, each of the drive motors 62 is electrically connected to the power supply of the tractor 10.

The operating switch 76 is constructed such that it can be used to cause the associated drive motor 62 to wind or unwind the cable 68 from the spool 64. As can be understood in FIG. 2, when the drive motor 62 is winding the cable 68 onto the spool 64, the decreasing length of the cable 68 causes the retaining panel 38 to rotate upward about its hinged connection to the sidewall 26 until it reaches the transporting position. Likewise, if the drive motor 62 is operated in the opposite direction to unwind the cable 68 from the spool 64, the increasing length of the cable 68 allows the retaining panel 38 to rotate downward until the retaining panel 38 reaches the loading position. In this manner, the drive assembly 60 can be used to move the respective retaining panel 38 between the loading position and the transporting position. Although the drive assembly 60 has been described and shown as including an electrically operated drive motor 62, it is contemplated by the inventor that a hand crank or similar structure could replace the drive motor 62 and be used to rotate the spool 64 and modify the effective length of the cable 68 while operating within the scope of the present invention. Additionally, it is contemplated that compressed air or hydraulic fluid driven cylinders could be included in the drive assembly 60 to raise and lower the retaining panels 38.

Referring now to FIGS. 5 and 6, at least one locking assembly 80 is associated with each individual retaining panel 38. Each locking assembly 80 includes a shaft 82 extending from the top rail 54 of the fixed panel 52 and terminating at a bottom end 83 positioned below the bottom edge of the sidewall 26. The shaft 82 is rotatable about its longitudinal axis and is rotatably supported within an upper guide 84 attached to the top rail 54, an intermediate guide 86 secured to the upper rail of the sidewall 26 (FIG. 2) and a lower guide 88 mounted to the sidewall 26 near the bottom edge of the sidewall. Each of the guides 84, 86 and 88 is a generally tubular member that allows the shaft 82 to rotatably pass therethrough while preventing lateral movement of the shaft 82.

Each locking assembly 80 includes a latch member 90 securely attached to the shaft 82 for rotation along with the shaft 82. The latch member 90 generally includes a pair of spaced plates 92 and 94. The plates 92 and 94 are spaced by a distance sufficient to receive and retain the locking tab 72 attached to the side rail 44 of the adjacent retaining panel 38. As can be seen in FIG. 6, the inner plate 94 has an arcuate shape that aids in guiding the locking tab 72 into the latch member 90 as the retaining panel 38 is moved into its transporting position. Additionally, the arcuate shape of the inner plate 94 aids in allowing the latch member 90 to rotate outward under the weight of the retaining panel 38 to allow the retaining panel 38 to move to the loading position.

A locking handle 96 is coupled to the bottom end 83 of the shaft 82 opposite the latch member 90. The locking handle 96 is pivotally attached to a bracket 98 fixed to the bottom end 83 of the shaft 82. Both the bracket 98 and the locking handle 96 rotate along with the shaft 82 about the longitudinal axis of the shaft 82. As shown in FIG. 5, the locking handle 96 can be received and held by a retaining member 100 that extends below the bottom edge of the sidewall 26. The retaining member 100 receives the locking handle 96 to prevent rotation of the locking handle 96. When the locking handle 96 is in the locked position and received by the retaining member 100, the shaft 82 is prevented from rotating about its longitudinal axis. Thus, when the shaft 82 is prevented from rotating, the latch member 90 securely retains the locking tab 72 and prevents the retaining panel 38 from moving from the transporting position.

To release the retaining panel 38, the locking handle 96 is rotated upward and disengaged from the retaining member 100. With the locking handle 96 removed from the retaining member 100, shaft 82 is freely rotatable to allow the latch member 90 to rotate and permit the movement of the retaining panel 38 from the transporting position.

Referring now to FIG. 4, in the preferred embodiment of the invention a pair of locking assemblies 80 are associated with each of the individual retaining panels 38. In addition to the locking assembly 80 mounted to the fixed panel 52, a second identical locking assembly 80 is mounted to a front panel 102 extending from the sidewall 26 of the trailer 12. In the embodiment shown, the rear retaining panel 38 also includes another locking assembly 80 mounted to a rear panel 104 extending from the sidewall 26. Each of these additional locking assemblies 80 are identical to those previously discussed and are used to receive and retain the opposite side of the respective retaining panel 38. Thus, each side of the retaining panel 38 can be locked in the transporting position to secure the retaining panel 38 during transportation of the plurality of stacked logs.

The front panel 102 is generally defined by a pair of extended uprights 106 and a wire mesh screen 108 mounted therebetween. Likewise, the rear panel 104 is also defined by a pair of extended uprights 110 and a wire mesh screen 112 mounted therebetween. The front panel 102 and rear panel 104 provide secure points of engagement for the pair of retaining panels 38 contained on each side of the trailer 12.

Referring now to FIG. 2, each upright 56 of the fixed panel 52 and the innermost upright 106 and 110 of the front and rear panels 102 and 104 includes a removed notch 114 positioned to receive the locking tab 72 formed on the retaining panel 38 positioned adjacent thereto. The notch 114 allows the retaining panel 38 to rotate completely upward such that the side rail 44 is generally flush with the upright 56, as shown in FIG. 6.

Operation of the convertible trailer 12 of the present invention will now be described from an initial condition in which each of the retaining panels 38 is locked in its upward vertical transporting position, as shown in FIG. 1. With each of the retaining panels 28 in the transporting position, the trailer 12 is pulled into a desired location for loading a plurality of logs. Once in the desired position, the operator releases the locking handle 96 of each locking assembly 80 associated with the retaining panel 38 to be lowered into the loading position. In the embodiment of the invention shown, each retaining panel 38 includes a pair of locking assemblies 80, such that two individual locking handles 96 must be released prior to movement of the retaining panel 38 from the transporting position.

After the locking handles 96 have been released, the operator uses the operating switch 76 for the respective retaining panel 38 to operate the drive motor 62 to unwind cable 68 from the spool 64. As the cable 68 unwinds from the spool 64, the weight of the retaining panel 38 causes the retaining panel 38 to rotate outward as shown in FIG. 2. The outward rotation of the retaining panel 38 forces the locking tab 72 on each side of the retaining panel 38 into contact with the outer plate 92 of the latch member 90. Since the latch member 90 is securely attached to the rotatable shaft 82, the outward movement of the locking tab 72 causes the latch member 90 and shaft 82 to rotate and release the locking tab 72. The drive motor 62 continues to operate until the retaining panel 38 is folded completely downward into the loading position. Corresponding steps are then followed to lower each of the retaining panels 38 into their loading position.

After each of the retaining panels 38 has been moved to the loading position, a stack of logs is assembled within the interior of the trailer 12. Since the upper half of the trailer 12 is generally open, loading logs within the trailer 12 is generally easier relative to a completely enclosed trailer.

After the stack of logs has been loaded, the operator uses the operating switch 76 to operate the drive motor 62 to wind the cable 68 back onto the spool 64. As the cable 68 is wound onto the spool 64, the associated retaining panel 38 rotates upward toward the transporting position. As the retaining panel 38 nears the transporting position, the locking tab 72 contacts the arcuate inner plate 94 of the latch member 90. Further movement of the retaining panel 38 causes the latch member 90 and shaft 82 to rotate into the position shown in FIG. 6. When the retaining panel 38 is completely moved into the transporting position, the locking tabs on each retaining panel 38 are received in the notches 114. Next, the locking handle 96 is pivoted upward and positioned in its locked position within the retaining member 100. In this manner, the latch member 90 locks the locking tab 72 and the associated retaining panel 38 in the transporting position.

Once each of the retaining panels 38 is locked in the transporting position, the trailer 12 completely encloses the stacked logs and prevents the logs from falling out of the sides of the trailer 12. When the trailer 12 reaches its final destination where the logs are to be unloaded, similar steps are followed to unlock each of the retaining panels and move them to their folded, loading position.

Although the present invention has been shown and discussed as being incorporated within a trailer pulled by a semi tractor 10, it is contemplated by the inventor that a similar embodiment could be incorporated in a railroad car utilized to haul stacked logs along the railway system. In such an embodiment, the railroad car would include individual movable retaining panels that are each operated by an alternate drive assembly driven by a source of low pressure air available in railway trains and incorporate corresponding locking assemblies. In the same manner as the trailer 12 shown in the figures, the retaining panels would prevent stacked logs from falling off the sides of the railroad car.

Various alternatives and embodiments are contemplated as being within the scope of the following claims particularly pointing out and distinctly claiming the subject matter regarded as the invention.

I claim:

1. An enclosure for transporting large bulk materials, the enclosure comprising:

a pair of opposed sidewalls extending along the longitudinal length of the enclosure, each of the sidewalls defined by a top edge surface;

at least one retaining panel mounted to each sidewall, each retaining panel having a top end and a bottom end, the bottom end of each retaining panel being hingedly mounted to the top edge surface of the sidewall and movable between a loading position and a transporting position; and a drive assembly associated with each of the retaining panels, the drive assembly including a drive motor and a cable attached at one end to the retaining panel near the top end of the retaining panel, wherein the drive motor is operable to wind and unwind the cable to move the retaining panel between the loading position and the transporting position.

2. An enclosure for transporting large bulk materials, the enclosure comprising:

a pair of opposed sidewalls extending along the longitudinal length of the enclosure, each of the sidewalls defined by a top edge surface;

at least one retaining panel mounted to each sidewall, each retaining panel having a top end and a bottom end, the bottom end of each retaining panel being hingedly mounted to the top edge surface of the sidewall and movable between a loading position and a transporting position;

a drive assembly associated with each of the retaining panels, the drive assembly being operable to move the retaining panel between the loading position and the transporting position; and at least one fixed panel extending from the top edge surface of each sidewall, the fixed panel positioned adjacent each of the retaining panels.

3. The enclosure of claim 2 further comprising at least one locking assembly positioned to releasably secure each retaining panel in the transporting position.

4. The enclosure of claim 3 wherein the locking assembly includes a latch member rotatably mounted to the fixed panel and positioned to engage the retaining panel as the retaining panel moves toward the transporting position.

5. The enclosure of claim 4 wherein the locking assembly further includes a locking handle securable in a locked position to prevent rotation of the latch member and lock the retaining panel in the transporting position.

6. The enclosure of claim 2 wherein the retaining panels are formed from wire mesh.

7. The enclosure of claim 2 wherein the fixed panel includes a pair of spaced uprights and wire mesh supported between the uprights.

8. A trailer for transporting a plurality of stacked logs, the trailer comprising:
   a pair of opposed sidewalls extending along the longitudinal length of the trailer, each of the sidewalls defined by a top edge surface;
   a pair of hinged retaining panels mounted to each of the sidewalls, each retaining panel having a top end and a bottom end, the bottom end of each retaining panel being hingedly mounted to the top edge surface of the sidewall and movable between a loading position and a transporting position;
   a fixed panel positioned between the pair of retaining panels on each of the sidewalls, the fixed panel having a pair of spaced uprights extending from the top edge surface of the lower sidewall; and
   a drive assembly associated with each of the retaining panels, the drive assembly being operable to move the respective retaining panel between the loading position and the transporting position.

9. The trailer of claim 8 wherein the drive assembly includes a drive motor and a cable attached at one end to the retaining panel near the top end of the retaining panel, wherein the drive motor is operable to wind and unwind the cable to move the respective retaining panel between the loading position and the transporting position.

10. The trailer of claim 9 wherein the cable of each drive assembly extends between one of the uprights of the fixed panel and the retaining panel.

11. The trailer of claim 8 further comprising at least one locking assembly positioned to releasably secure each retaining panel in the transporting position.

12. The trailer of claim 11 wherein each locking assembly includes a latch member positioned to engage the retaining panel in the transporting position.

13. The trailer of claim 12 wherein at least one of the latch members of the respective locking assembly for each retaining panel is rotatably mounted on the fixed panel and is positioned to engage the retaining panel as the retaining panel moves toward the transporting position.

14. The trailer of claim 13 wherein each locking assembly further includes a locking handle securable in a locked position to prevent rotation of the latch member and lock the retaining panel in the transporting position.

15. The trailer of claim 13 wherein each latch member is rotatably mounted to one of the uprights defining the fixed panel, the latch member rotating to a latched position to secure the retaining panel in the transporting position.

16. The trailer of claim 8 wherein each of the retaining panels is formed from wire mesh.

17. The trailer of claim 9 wherein the fixed panel includes wire mesh positioned between the spaced uprights.

18. A trailer for transporting a plurality of logs, the trailer comprising:
   a pair of opposed sidewalls extending along the longitudinal length of the trailer, each of the sidewalls defined by a top edge surface;
   a pair of hinged retaining panels mounted to each of the sidewalls, each retaining panel having a top end and a bottom end, the bottom end of each retaining panel being hingedly mounted to the top edge surface of the sidewall and movable between a loading position and a transporting position;
   a fixed panel attached to each sidewall, the fixed panel being positioned between the pair of retaining panels and defined by a pair of uprights extending from the top edge surface of the sidewall;
   a cable associated with each retaining panel, the cable extending between the top end of the retaining panel and one of the uprights defining the fixed panel;
   a drive motor associated with each retaining panel, the drive motor coupled to the cable and attached to the retaining panel, the drive motor being operable to wind and unwind the cable to move the retaining panel between the loading position and the transporting position; and
   a locking assembly associated with each of the retaining panels to releasably secure the retaining panel in the transporting position, each locking assembly including a latch member rotatably attached to the fixed panel and positioned to engage the retaining panel.

19. The trailer of claim 18 further comprising a locking tab formed on each of the retaining panels, the locking tab being received by the latch member to secure the retaining panel in the transporting position.

20. The trailer of claim 19 wherein the locking assembly includes a locking handle securable in a locked position to prevent rotation of the latch member and lock the retaining panel in the transporting position.

* * * * *